United States Patent
Iijima

(10) Patent No.: US 10,144,796 B2
(45) Date of Patent: Dec. 4, 2018

(54) POLYMERIZABLE COMPOSITION, OPTICAL MEMBER, PLASTIC LENS, AND EYEGLASS LENS

(71) Applicant: HOYA LENS THAILAND LTD., Patumthani (TH)

(72) Inventor: Takayuki Iijima, Tokyo (JP)

(73) Assignee: HOYA LENS THAILAND LTD., Patumthani (TH)

( * ) Notice: Subject to any disclaimer, the term of this patent is extended or adjusted under 35 U.S.C. 154(b) by 0 days.

(21) Appl. No.: 15/561,303

(22) PCT Filed: Mar. 25, 2016

(86) PCT No.: PCT/JP2016/059748
§ 371 (c)(1),
(2) Date: Sep. 25, 2017

(87) PCT Pub. No.: WO2016/153061
PCT Pub. Date: Sep. 29, 2016

(65) Prior Publication Data
US 2018/0100033 A1 Apr. 12, 2018

(30) Foreign Application Priority Data

Mar. 25, 2015 (JP) .................................. 2015-062740

(51) Int. Cl.
| | |
|---|---|
| *C08G 18/38* | (2006.01) |
| *C08G 18/75* | (2006.01) |
| *C08G 18/73* | (2006.01) |
| *G02B 1/04* | (2006.01) |
| *G02C 7/02* | (2006.01) |

(52) U.S. Cl.
CPC ......... *C08G 18/3876* (2013.01); *C08G 18/73* (2013.01); *C08G 18/755* (2013.01); *G02B 1/041* (2013.01); *G02C 7/02* (2013.01)

(58) Field of Classification Search
None
See application file for complete search history.

(56) References Cited

U.S. PATENT DOCUMENTS

| | | | | | |
|---|---|---|---|---|---|
| 5,837,797 | A | * | 11/1998 | Okazaki ................. | C07C 321/14 528/76 |
| 6,100,362 | A | * | 8/2000 | Okazaki ................. | C07C 321/14 528/76 |
| 9,193,831 | B2 | * | 11/2015 | Kousaka .............. | C08G 18/798 |
| 2014/0200323 | A1 | * | 7/2014 | Itoh ........................ | G02B 1/041 528/67 |
| 2014/0243496 | A1 | * | 8/2014 | Kousaka .............. | C08G 18/798 528/80 |
| 2014/0296431 | A1 | * | 10/2014 | Kousaka .............. | B29C 39/006 524/710 |
| 2014/0327869 | A1 | | 11/2014 | Renzi | |
| 2015/0166718 | A1 | * | 6/2015 | Okamoto ................. | G02B 1/04 528/73 |
| 2017/0226267 | A1 | | 8/2017 | Shinohara | |
| 2017/0226268 | A1 | * | 8/2017 | Iijima ................ | C08G 18/3876 |
| 2017/0240683 | A1 | * | 8/2017 | Iijima ................ | C08G 18/3876 |

FOREIGN PATENT DOCUMENTS

| | | |
|---|---|---|
| JP | H07-247335 A | 9/1995 |
| JP | H07-252207 A | 10/1995 |
| JP | 2008-255221 A | 10/2008 |
| JP | 2008255221 | 10/2008 |
| JP | 2012-181268 A | 9/2012 |
| WO | 2013/024863 A1 | 2/2013 |
| WO | 2013/032010 A1 | 3/2013 |
| WO | 2013/073194 A1 | 5/2013 |
| WO | 2016/021680 A1 | 2/2016 |
| WO | 2016021680 | 2/2016 |

OTHER PUBLICATIONS

Apr. 19, 2016 International Search Report issued in International Patent Application No. PCT/JP2016/059748.
Apr. 19, 2016 Written Opinion issued in International Patent Application No. PCT/JP2016/059748.
Hoya lens Thailand Ltd.; Certificate of Priority Document of U.S. Appl. No. 15/561,303, which is a specification of Japanese Patent Application No. 2015-062740; Date of issue of this certificate: Apr. 12, 2016; Evidence of publication: Sep. 26, 2017.

* cited by examiner

*Primary Examiner* — Joseph D Anthony
(74) *Attorney, Agent, or Firm* — Oliff PLC

(57) ABSTRACT

Provided are a polymerizable composition allowing obtainment of an optical component with reduced striae, an optical component obtained from the polymerizable composition, a plastic lens containing the optical component, and a spectacle lens including a lens substrate including the optical component. The polymerizable composition of the present disclosure contains an isocyanate component which contains alicyclic polyisocyanate (A-1) having two or more isocyanate groups and non-cyclic aliphatic polyisocyanate (A-2) having two or more isocyanate groups, and a polythiol component which contains polythiol (B-1) having four or more mercapto groups and two or more sulfide bonds and polythiol (B-2) having two or three mercapto groups and two or three ester bonds. The optical component is obtained by polymerizing the polymerizable composition of the present disclosure. The plastic lens contains the optical component of the present disclosure. The spectacle lens includes a lens substrate which includes the optical component.

14 Claims, No Drawings

POLYMERIZABLE COMPOSITION, OPTICAL MEMBER, PLASTIC LENS, AND EYEGLASS LENS

TECHNICAL FIELD

The present disclosure relates to a polymerizable composition containing a polyisocyanate compound and a polythiol compound, an optical component obtained from the polymerizable composition, a plastic lens containing the optical component, and a spectacle lens including a lens substrate including the optical component.

BACKGROUND ART

It is known that a plastic lens with high refractive index can be obtained by reacting a polyisocyanate compound with a polythiol compound (see, Patent Literature 1, for example). In Patent Literature 1, a sulfur-containing urethane-based resin lens which is obtained by heating and curing a composition containing tetrathiol and at least one ester compound selected from a polyisocyanate compound, a polyisothiocyanate compound, and an isothiocyanate compound having an isocyanate group is disclosed. It is described that the lens is colorless and transparent and has a physical property of excellent heat resistance due to high refractive index and low dispersion and also excellent productivity.

CITATION LIST

Patent Literature

Patent Literature 1: JP 7-252207 A

SUMMARY

Technical Problem

However, the lens disclosed in Patent Literature 1 is problematic in that, as a cross-linked structure is formed at low temperature in order to use tetrathiol, viscosity increase is fast during the polymerization and striae are easily generated compared to other urethane resin-based plastic lenses.

Thus, an object of one example of the present disclosure is to provide a polymerizable composition allowing obtainment of an optical component with reduced striae, an optical component obtained from the polymerizable composition, a plastic lens containing the optical component, and a spectacle lens including a lens substrate including the optical component.

Furthermore, an object of one example of the present disclosure is to provide a polymerizable composition allowing obtainment of an optical component with excellent tensile strength, an optical component obtained from the polymerizable composition, a plastic lens containing the optical component, and a spectacle lens including a lens substrate including the optical component.

Solution to Problem

To solve the problems described above, the inventors of the present disclosure conducted intensive studies. As a result, it was found that, by using a polymerizable composition which contains an isocyanate component containing pre-determined alicyclic polyisocyanate and pre-determined non-cyclic aliphatic polyisocyanate and a polythiol component containing pre-determined polythiol, the above problems can be solved, and the present disclosure is completed accordingly. Namely, the present disclosure is as described below.

[1] A polymerizable composition including; an isocyanate component which contains alicyclic polyisocyanate (A-1) having two or more isocyanate groups and non-cyclic aliphatic polyisocyanate (A-2) having two or more isocyanate groups; and a polythiol component which contains polythiol (B-1) having four or more mercapto groups and two or more sulfide bonds and polythiol (B-2) having two or three mercapto groups and two or three ester bonds.

[2] An optical component obtained by polymerizing the polymerizable composition according to [1].

[3] A plastic lens including the optical component according to [2].

[4] A spectacle lens including a lens substrate which includes the optical component according to [2].

Advantageous Effects of Invention

According to one example of the present disclosure which has been described above, a polymerizable composition allowing obtainment of an optical component with reduced striae, an optical component obtained from the polymerizable composition, a plastic lens containing the optical component, and a spectacle lens including a lens substrate including the optical component can be provided.

According to one example of the present disclosure which has been described above, a polymerizable composition allowing obtainment of an optical component with excellent tensile strength, an optical component obtained from the polymerizable composition, a plastic lens containing the optical component, and a spectacle lens including a lens substrate including the optical component can be provided.

DESCRIPTION OF EMBODIMENTS

[Polymerizable Composition]

The polymerizable composition of the present disclosure contains an isocyanate component which contains alicyclic polyisocyanate (A-1) having two or more isocyanate groups and non-cyclic aliphatic polyisocyanate (A-2) having two or more isocyanate groups, and a polythiol component which contains polythiol (B-1) having four or more mercapto groups and two or more sulfide bonds and polythiol (B-2) having two or three mercapto groups and two or three ester bonds. Hereinbelow, the polymerizable composition of the present disclosure is explained in detail.

<Isocyanate Component>

The isocyanate component used for the polymerizable composition of the present disclosure contains the alicyclic polyisocyanate (A-1) having two or more isocyanate groups and the non-cyclic aliphatic polyisocyanate (A-2) having two or more isocyanate groups.

(Alicyclic Polyisocyanate (A-1))

The alicyclic polyisocyanate (A-1) may have two isocyanate groups.

Examples of the alicyclic polyisocyanate (A-1) include isophorone diisocyanate, methylene biscyclohexyl diisocyanate, bis(isocyanatemethyl)cyclohexane, bis(isocyanatemethyl)bicyclo[2.2.1]heptane, methylcyclohexane diisocyanate, dicyclohexylmethane diisocyanate, dimethyldicyclohexylmethane diisocyanate, and dicyclohexyldimethylmethane diisocyanate. These alicyclic polyisocyanates may be used either singly or in combinations or two or more types.

From the viewpoint of obtaining an optical component with reduced striae, the alicyclic polyisocyanate (A-1) may be at least one selected from a group consisting of isophorone diisocyanate, methylene biscyclohexyl diisocyanate, bis(isocyanatemethyl)cyclohexane, and bis(isocyanatemethyl)bicyclo[2.2.1]heptane. From the viewpoint of improving further the tensile strength of an optical component which is produced by using the polymerizable composition, it may be at least one selected from a group consisting of isophorone diisocyanate, 4,4'-methylene biscyclohexyl diisocyanate, 1,3-bis(isocyanatemethyl)cyclohexane, and bis(isocyanatemethyl)bicyclo[2.2.1]heptane.

(Non-Cyclic Aliphatic Polyisocyanate (A-2))

The non-cyclic aliphatic polyisocyanate (A-2) may have two isocyanate groups.

Examples of the non-cyclic aliphatic polyisocyanate (A-2) include hexamethylene diisocyanate, butene diisocyanate, butadiene diisocyanate, bis(isocyanateethyl)carbonate, and bis(isocyanateethyl) ether. These polyisocyanates may be used either singly or in combinations or two or more types. From the viewpoint of obtaining an optical component with reduced striae, and also from the viewpoint of improving the tensile strength of an optical component which is produced by using the polymerizable composition, the non-cyclic aliphatic polyisocyanate (A-2) may be at least one selected from a group consisting of hexamethylene diisocyanate and trimethylhexamethylene diisocyanate.

(Other Polyisocyanate)

The isocyanate component of the polymerizable composition of the present disclosure may contain, within a range in which the effect of the present disclosure is not impaired, polyisocyanate other than the alicyclic polyisocyanate (A-1) and the non-cyclic aliphatic polyisocyanate (A-2), if necessary.

(Ratio of Total of the Alicyclic Polyisocyanate (A-1) and the Non-Cyclic Aliphatic Polyisocyanate (A-2))

The ratio of the total of the alicyclic polyisocyanate (A-1) and the non-cyclic aliphatic polyisocyanate (A-2) in the isocyanate component used for the polymerizable composition of the present disclosure may be, relative to the total mass of the isocyanate component, 80% by mass or more, 90% by mass or more, 95% by mass or more, and 100% by mass or less. As the ratio of the total of the alicyclic polyisocyanate (A-1) and the non-cyclic aliphatic polyisocyanate (A-2) is 80% by mass or more, the effect of suppressing striae of an optical component to be obtained can be further enhanced. Furthermore, it is also possible to improve the tensile strength of an optical component which is produced by using the polymerizable composition of the present disclosure.

(Molar Ratio [(A-1)/(A-2)])

The molar ratio [(A-1)/(A-2)] between the alicyclic polyisocyanate (A-1) and the non-cyclic aliphatic polyisocyanate (A-2) may be, from the viewpoint of further improving the effect of suppressing striae of an optical component to be obtained, 95/5 to 50/50, 90/10 to 50/50, and 90/10 to 60/40. As the molar ratio is within the above range, the tensile strength of an optical component which is produced by using the polymerizable composition of the present disclosure can be improved.

<Polythiol Component>

The polythiol component used in the polymerizable composition of the present disclosure contains the polythiol (B-1) having four or more mercapto groups and two or more sulfide bonds and the polythiol (B-2) having two or three mercapto groups and two or three ester bonds.

(Polythiol (B-1))

The polythiol (B-1) may have four mercapto groups.

Furthermore, the polythiol (B-1) may have three or more sulfide bonds and may have three sulfide bonds.

Examples of the polythiol (B-1) include bis(mercaptomethyl)trithiaundecanedithiol, mercaptomethylbismercaptodithiaoctane, bis(mercaptomethyl)dithiane, bis(mercaptomethylthio)dithiane, and (bis(mercaptomethylthio)ethyl) dithietane. The polythiols (B-1) may be used either singly or in combinations or two or more types.

From the viewpoint of obtaining an optical component with high refractive index, heat resistance, and tensile strength, the polythiol (B-1) may be bis(mercaptomethyl) trithiaundecanedithiol, at least one selected from a group consisting of 4,8-bis(mercaptomethyl)-3,6,9-trithiaundecane-1,11-dithiol, 4,7-bis(mercaptomethyl)-3,6,9-trithiaundecane-1,11-dithiol, and 5,7-bis(mercaptomethyl)-3,6,9-trithiaundecane-1,11-dithiol, and: a mixture of 4,8-bis(mercaptomethyl)-3,6,9-trithiaundecane-1,11-dithiol, 4,7-bis(mercaptomethyl)-3,6,9-trithiaundecane-1,11-dithiol, and 5,7-bis(mercaptomethyl)-3,6,9-trithiaundecane-1,11-dithiol.

(Polythiol (B-2))

Examples of the polythiol (B-2) include trimethylol propane tris(thioglycolate), trimethylol propane tris(mercaptopropionate), butanediol bis(thioglycolate), butanediol bis(mercaptopropionate), diethylene glycol bis(mercaptoacetate), diethylene glycol bis(mercaptopropionate), ethylene glycol bis(mercaptoacetate), ethylene glycol bis(mercaptopropionate), and pentaerythritol tetrakis (2-mercaptoacetate). These polythiols may be used either singly or in combinations or two or more types.

From the viewpoint of obtaining an optical component with reduced striae, and also from the viewpoint of improving further the tensile strength of an optical component which is produced by using the polymerizable composition, the polythiol (B-2) may be at least one selected from a group consisting of trimethylol propane tris(thioglycolate), trimethylol propane tris(mercaptopropionate), butanediol bis(thioglycolate), and butanediol bis(mercaptopropionate), and at least one selected from a group consisting of trimethylol propane tris(thioglycolate), trimethylol propane tris(3-mercaptopropionate), 1,4-butanediol bis(thioglycolate), and 1,4-butanediol bis(3-mercaptopropionate).

It may have better that the polythiol (B-2) has three mercapto groups. Accordingly, the heat resistance and tensile strength of an optical component which is produced by using the polymerizable composition of the present disclosure can be improved. In that case, the polythiol (B-2) having three mercapto groups may be at least one selected from a group consisting of trimethylol propane tris(thioglycolate) and trimethylol propane tris(mercaptopropionate), and may be at least one selected from a group consisting of trimethylol propane tris(thioglycolate) and trimethylol propane tris(3-mercaptopropionate).

(Other Polythiol)

The polythiol component of the polymerizable composition of the present disclosure may contain, within a range in which the effect of the present disclosure is not impaired, polythiol other than the polythiol (B-1) and the polythiol (B-2), if necessary.

From the viewpoint of obtaining an optical component with further reduced striae, the polymerizable composition which may be among the polymerizable compositions of the present disclosure may be as follows:

the alicyclic polyisocyanate (A-1) is at least one selected from a group consisting of isophorone diisocyanate, methylene biscyclohexyl diisocyanate, bis(isocyanatemethyl)cyclohexane, and bis(isocyanatemethyl)bicyclo[2.2.1]heptane, the non-cyclic aliphatic polyisocyanate (A-2) is at least one selected from a group consisting of hexamethylene diisocyanate and trimethylhexamethylene diisocyanate, the polythiol (B-1) is at least one selected from a group consisting of 4,8-bis(mercaptomethyl)-3,6,9-trithiaundecane-1,11-dithiol, 4,7-bis(mercaptomethyl)-3,6,9-trithiaundecane-1,11-dithiol, and 5,7-bis(mercaptomethyl)-3,6,9-trithiaundecane-1,11-dithiol, and, the polythiol (B-2) is at least one selected from a group consisting of trimethylol propane tris(thioglycolate), trimethylol propane tris(3-mercaptopropionate), 1,4-butanediol bis(thioglycolate), and 1,4-butanediol bis(3-mercaptopropionate).

Among those described above, a combination of the following monomer components may have better.

(1) combination of a mixture of isophorone diisocyanate and hexamethylene diisocyanate as an isocyanate component, and 4,8-bis(mercaptomethyl)-3,6,9-trithiaundecane-1,11-dithiol, 4,7-bis(mercaptomethyl)-3,6,9-trithiaundecane-1,11-dithiol, and 5,7-bis(mercaptomethyl)-3,6,9-trithiaundecane-1,11-dithiol as a polythiol component with trimethylol propane tris(thioglycolate), (2) combination of a mixture of isophorone diisocyanate and trimethylhexamethylene diisocyanate as an isocyanate component and 4,8-bis(mercaptomethyl)-3,6,9-trithiaundecane-1,11-dithiol, 4,7-bis(mercaptomethyl)-3,6,9-trithiaundecane-1,11-dithiol, and 5,7-bis(mercaptomethyl)-3,6,9-trithiaundecane-1,11-dithiol as a polythiol component with trimethylol propane tris(thioglycolate), and (3) combination of a mixture of dicyclohexylmethane diisocyanate and hexamethylene diisocyanate as an isocyanate component and 4,8-bis(mercaptomethyl)-3,6,9-trithiaundecane-1,11-dithiol, 4,7-bis(mercaptomethyl)-3,6,9-trithiaundecane-1,11-dithiol, and 5,7-bis(mercaptomethyl)-3,6,9-trithiaundecane-1,11-dithiol as a polythiol component with trimethylol propane tris(thioglycolate).

(Ratio of Total of the Polythiol (B-1) and the Polythiol (B-2))

The ratio of the total of the polythiol (B-1) and the polythiol (B-2) in the polythiol component used for the polymerizable composition of the present disclosure may be, relative to the total mass of the polythiol component, 70% by mass or more, 80% by mass or more, 90% by mass or more, and 100% by mass or less. As the ratio of the total of the polythiol (B-1) and the polythiol (B-2) is 70% by mass or more, the effect of suppressing striae of an optical component to be obtained can be further enhanced. Furthermore, it is also possible to improve the tensile strength of an optical component which is produced by using the polymerizable composition of the present disclosure.

(Molar Ratio [(B-1)/(B-2)])

The molar ratio [(B-1)/(B-2)] between the polythiol (B-1) and the polythiol (B-2) may be, from the viewpoint of further enhancing the effect of suppressing the striae of an optical component to be obtained, 90/10 to 50/50, 90/10 to 60/40, and 85/15 to 65/35. As the molar ratio [(B-1)/(B-2)] is within the above range, the tensile strength of an optical component which is produced by using the polymerizable composition can be improved.

<Use Ratio>

The use ratio between the polythiol component and the polyisocyanate component may be, in terms of the functional group molar ratio between SH group and/NCO group,
within a range of from 0.3 to 2.0, within a range of from 0.7 to 1.5, within a range of from 0.7 to 1.2, and within a range of from 0.8 to 1.1.

<Other Component>

It is also possible that the polymerizable composition of the present disclosure consists of the above isocyanate component and the above polythiol component only. The content of the total of the isocyanate component and the polythiol component may be 80% by mass or more, 90% by mass or more, 95% by mass or more, and 98% by mass or more and 100% by mass or less in the polymerizable composition.

However, the polymerizable composition of the present disclosure may contain, within a range in which the effect of the present disclosure is not impaired, a component which is different from the components of the above isocyanate component and the above polythiol component. Examples of such component include a compound which is copolymerizable with the above isocyanate component and the above polythiol component, an active hydrogen compound represented by amine, an epoxy compound, an olefin compound, a carbonate compound, an ester compound, a metal, a metal oxide, an organometallic compound, and an inorganic material. They may be used either singly or in combination of two or more types.

Furthermore, for control to desired reaction rate, a known reaction catalyst used for production of polythiourethane may be suitably added to the polymerizable composition of the present disclosure. Examples of the reaction catalyst include organic tin like dimethyl tin dichloride. The blending amount of the reaction catalyst may be, relative to the total amount of 100 parts by mass of the isocyanate component and polythiol component, 0.01 to 1 part by mass, 0.05 to 0.5 part by mass, and 0.08 to 0.3 part by mass.

A releasing agent may be also added. Examples of the releasing agent include a phosphoric acid-based releasing agent such as butoxy ethyl acid phosphate or dibutoxy ethyl acid phosphate. The blending amount of the releasing agent may be, relative to the total amount of 100 parts by mass of the isocyanate component and polythiol component, 0.01 to 1 part by mass, 0.1 to 0.5 part by mass, and 0.2 to 0.3 part by mass.

Furthermore, depending on purpose, various materials including a chain extending agent, a cross-linking agent, a photostabilizer, a UV absorbing agent, an anti-oxidizing agent, an oil-soluble dye, a filler, a releasing agent, and a blueing agent may be added to the polymerizable composition of the present disclosure.

[Optical Component]

The optical component of the present disclosure is obtained by polymerizing the polymerizable composition of the present disclosure. The optical component of the present disclosure may be produced as described below, for example.

The method for producing an optical component includes a step of carrying out cast polymerization of the polymerizable composition. For example, the polymerizable composition of the present disclosure is degassed, if necessary, and injected thereafter to a molding die. Then, the polymerizable composition injected to a molding die is polymerized. As for the molding die, a molding die consisting of a pair of glass mold or metal mold and a tape- or resin-based gasket is used. The polymerization time for polymerizing the polymerizable resin in a molding die is 3 to 96 hours, for example. The polymerization temperature is 0 to 130 degrees, for example. To have a favorable release property of a transparent resin, which is prepared by polymerizing the polymerizable composition, from a molding die, it is also possible that a releasing agent is applied on releasing surface of a molding die or a releasing agent is added to the polymerizable composition. The optical component to be obtained accordingly has reduced striae, high index, low dispersion, and low specific gravity. The optical component to be obtained also has excellent tensile strength. For such reasons, the optical component of the present disclosure is suitably used as an optical component of an optical device such as a spectacle lens or a camera lens.

[Plastic Lens]

The plastic lens of the present disclosure includes the optical component of the present disclosure, and may be a spectacle lens including a lens substrate including the optical component of the present disclosure. The plastic lens of the present disclosure exhibits the effect of having reduced striae, high index, low dispersion, and low specific gravity. Furthermore, the plastic lens of the present disclosure has excellent tensile strength. The plastic lens of the disclosure may consist of the optical component of the present disclosure only, or it may contain other optical component.

If necessary, an anti-reflection treatment or a surface polishing and dyeing treatment for having a fashion property or the like can be carried out for the optical component of the present disclosure.

To have high hardness, improved abrasion resistance, improved chemical resistance, and an anti-fogging property, the spectacle lens may have at least one selected from a group consisting of an anti-static layer, a hard coating layer, an anti-reflection layer, and a light illuminating layer on top of the lens substrate consisting of the optical component of the present disclosure.

With regard to the examples, content, and physical properties of the aforementioned each component, it is possible that those exemplified in the detailed description or described as a preferred scope of the disclosure are arbitrarily combined.

Furthermore, with regard to the composition described in Examples, if an adjustment is made to the composition described in the detailed description of the disclosure, the disclosed embodiment can be carried out in the same manner as Examples over the entire claimed composition range.

EXAMPLES

Hereinbelow, the present disclosure is further specifically explained by way of Examples, but it is evident that the present disclosure is not limited to Examples.

For the plastic lenses of Examples and Comparative Examples, refractive index, Abbe number, heat resistance, striae, transparency, optical distortion, and tensile strength were evaluated.

(Refractive Index and Abbe Number)

By using precision refractometer KPR-2000 which is manufactured by Kalnew Optical Industrial Co., Ltd., the refractive index of plastic lens was measured at 20 degrees for the light with wavelength of F' ray (488.0 nm), C' ray (643.9 nm), and e ray (546.1 nm). Then, by using the following formula, Abbe number was calculated.

Abbe number $v_e = (n_e - 1)/(n_{F'} - n_{C'})$ $n_e$ represents the refractive index when measurement is made with a wavelength of e ray, $n_{F'}$ represents the refractive index when measurement is made with a wavelength of F' ray, and $n_{C'}$ represents the refractive index when measurement is made with a wavelength of C' ray.

(Heat Resistance)

According to a penetration method using TAS100TMA which is manufactured by Rigaku Corporation (thickness of test specimen: 3 mm, pin diameter: 0.5 mm, load: 10 g, and temperature increase rate: 10 degrees/min), heat distortion temperature was measured.

(Striae)

The obtained plastic lens was observed with a naked eye according to Schlieren method, and striae of the plastic lens was evaluated based on the following three levels.

Those having no striae: VG (Very Good)
Those observed with slight striae: G (Good)
Those observed with many striae: B (Bad)

The plastic lens with evaluation result of VG or G has practically no problem in terms of striae. On the other hand, the plastic lens with the evaluation result of B is not suitable for practical use.

(Transparency)

The obtained plastic lens was observed with a naked eye under a fluorescent lamp in dark room, and transparency of the plastic lens was evaluated based on the following three levels.

Those having no cloudiness and no precipitation of opaque materials: VG (Very Good)
Those observed with slight cloudiness or precipitation of opaque materials, or both of them: G (Good)
Those observed with cloudiness at strong level or clear precipitation of opaque materials: B (Bad)

The plastic lens with evaluation result of VG or G has practically no problem in terms of transparency. On the other hand, the plastic lens with the evaluation result of B is not suitable for practical use.

(Optical Distortion)

The obtained plastic lens was observed with a naked eye using a strain scope, and optical distortion of the plastic lens was evaluated based on the following three levels.

Those having no optical distortion: VG (Very Good)
Those observed with slight optical distortion: G (Good)
Those having a large amount of optical distortion: B (Bad)

The plastic lens with evaluation result of VG or G has practically no problem in terms of optical distortion. On the other hand, the plastic lens with the evaluation result of B is not suitable for practical use.

(Tensile Strength)

By using a drill, a hole with 1.6 mm diameter was formed at 2 areas of a lens which has been adjusted to have 0.00 D, lens diameter of 50 mm, and thickness of 1.8 mm, and thus a sample was obtained. On Tensilon universal material tester manufactured by A&D Company, Limited (model number; RTC-1225A), both ends of the sample were fixed by using a pin with diameter of 1.6 mm. Then, elongation was made at rate of 0.05 mm/min, and the strength at break was measured.

The plastic lenses of the following Examples, Comparative Examples, and Reference Examples were produced as described below.

Example 1

A mixture which has been obtained by sufficient mixing by stirring at room temperature of 33.6 parts by mass of isophorone diisocyanate (hereinbelow, described as "IPDI"), 35.1 parts by mass of a mixture of 4,8-bis(mercaptomethyl)-3,6,9-trithiaundecane-1,11-dithiol, 4,7-bis(mercaptomethyl)-3,6,9-trithiaundecane-1,11-dithiol, and 5,7-bis(mercaptomethyl)-3,6,9-trithiaundecane-1,11-dithiol (hereinbelow, described as "the polythiol (B-1-1)"), 16.9 parts by mass of hexamethylene diisocyanate (hereinbelow, described as "HDI"), 14.4 parts by mass of trimethylol propane tris(thioglycolate) (hereinbelow, described as "TMTG"), 0.10 part by mass of dimethyl tin dichloride, and 0.20 part by mass of a mixture of butoxyethyl acid phosphate and dibutoxyethyl acid phosphate (manufactured by JOHOKU CHEMICAL CO., LTD. Product name: JP-506H) was degassed under reduced pressure of 5 mmHg to prepare a homogeneously-prepared monomer mixture. The resulting monomer mixture was injected to a molding die which consists of a pair of glass molds and a gasket made of resin. Furthermore, as for the pair of glass molds, a pair with top mold curvature of 600 mm and bottom mold curvature of 120 mm was used, and thus the molding die was assembled such that the center thickness of a plastic lens becomes 5 mm and the diameter of a plastic lens becomes 75 mm.

After injecting the monomer mixture to the molding die, the temperature was raised from 20 degrees to 120 degrees over 15 hours followed by heat polymerization for 4 hours at 120 degrees. After cooling, by extracting the plastic lens from the molding die, the plastic lens of Example 1 was obtained.

Example 2

The plastic lens of Example 2 was produced by preparing a polymerizable composition in the same manner as Example 1 except that the blending amount of IPDI was modified to 43.6 parts by mass, the blending amount of the polythiol (B-1-1) was modified to 34.2 parts by mass, the blending amount of HDI was modified to 8.2 parts by mass, and the blending amount of TMTG was modified to 14.0 parts by mass.

Example 3

The plastic lens of Example 3 was produced by preparing a polymerizable composition in the same manner as Example 1 except that the blending amount of IPDI was modified to 34.2 parts by mass, the blending amount of the polythiol (B-1-1) was modified to 42.4 parts by mass, the blending amount of HDI was modified to 17.3 parts by mass, and the blending amount of TMTG was modified to 6.1 parts by mass.

Example 4

The plastic lens of Example 4 was produced by preparing a polymerizable composition in the same manner as Example 1 except that the blending amount of IPDI was modified to 42.7 parts by mass, the blending amount of the polythiol (B-1-1) was modified to 26.4 parts by mass, the blending amount of HDI was modified to 8.1 parts by mass, and the blending amount of TMTG was modified to 22.8 parts by mass.

Example 5

The plastic lens of Example 5 was produced by preparing a polymerizable composition in the same manner as Example 1 except that the blending amount of IPDI was modified to 35.8 parts by mass, the blending amount of the polythiol (B-1-1) was modified to 36.4 parts by mass, the blending amount of HDI was modified to 14.6 parts by mass, and 13.2 parts by mass of trimethylol propane tris(3-mercaptopropionate) (hereinbelow, described as "TMTP") was used instead of TMTG.

Example 6

The plastic lens of Example 6 was produced by preparing a polymerizable composition in the same manner as Example 1 except that the blending amount of IPDI was modified to 40.5 parts by mass, the blending amount of the polythiol (B-1-1) was modified to 37.5 parts by mass, the blending amount of HDI was modified to 11.3 parts by mass, and 10.7 parts by mass of 1,4-butanediol bis(mercaptoacetate) (hereinbelow, described as "BDTG") was used instead of TMTG.

Example 7

The plastic lens of Example 7 was produced by preparing a polymerizable composition in the same manner as Example 1 except that the blending amount of IPDI was modified to 33.3 parts by mass, the blending amount of the polythiol (B-1-1) was modified to 36.6 parts by mass, the blending amount of HDI was modified to 16.8 parts by mass, and 13.3 parts by mass of 1,4-butanediol bis(mercaptopropionate) (hereinbelow, described as "BDTP") was used instead of TMTG.

Example 8

The plastic lens of Example 8 was produced by preparing a polymerizable composition in the same manner as Example 1 except that the blending amount of IPDI was modified to 38.2 parts by mass, the blending amount of the polythiol (B-1-1) was modified to 40.5 parts by mass, the blending amount of TMTG was modified to 5.8 parts by mass, and 15.5 parts by mass of trimethylhexamethylene diisocyanate (hereinbelow, described as "TMDI") was used instead of HDI.

Example 9

The plastic lens of Example 9 was produced by preparing a polymerizable composition in the same manner as Example 1 except that the blending amount of IPDI was modified to 32.6 parts by mass, the blending amount of the polythiol (B-1-1) was modified to 40.3 parts by mass, 20.6 parts by mass of TMDI was used instead of HDI, and 6.5 parts by mass of TMTP was used instead of TMTG.

Example 10

The plastic lens of Example 10 was produced by preparing a polymerizable composition in the same manner as Example 1 except that the blending amount of IPDI was modified to 37.7 parts by mass, the blending amount of polythiol (B-1-1) was modified to 35.5 parts by mass, 15.3 parts by mass of TMDI was used instead of HDI, and 11.5 parts by mass of BDTG was used instead of TMTG.

Example 11

The plastic lens of Example 11 was produced by preparing a polymerizable composition in the same manner as Example 1 except that the blending amount of IPDI was modified to 42.4 parts by mass, the blending amount of the polythiol (B-1-1) was modified to 34.9 parts by mass, 10.0 parts by mass of TMDI was used instead of HDI, and 12.7 parts by mass of BDTP was used instead of TMTG.

Example 12

The plastic lens of Example 12 was produced by preparing a polymerizable composition in the same manner as Example 1 except that 37.3 parts by mass of dicyclohexylmethane diisocyanate (hereinbelow, described as "HMDI") was used instead of IPDI, the blending amount of the polythiol (B-1-1) was modified to 32.6 parts by mass, the blending amount of HDI was modified to 16.0 parts by mass, and the blending amount of TMTG was modified to 14.1 parts by mass.

Example 13

The plastic lens of Example 13 was produced by preparing a polymerizable composition in the same manner as Example 12 except that the blending amount of HMDI was modified to 47.8 parts by mass, the blending amount of the polythiol (B-1-1) was modified to 35.5 parts by mass, the blending amount of HDI was modified to 7.7 parts by mass, and 9.1 parts by mass of TMTP was used instead of TMTG.

Example 14

The plastic lens of Example 14 was produced by preparing a polymerizable composition in the same manner as Example 12 except that the blending amount of HMDI was modified to 37.8 parts by mass, the blending amount of the polythiol (B-1-1) was modified to 39.6 parts by mass, the blending amount of HDI was modified to 16.2 parts by mass, and 6.4 parts by mass of BDTP was used instead of TMTG.

Example 15

The plastic lens of Example 15 was produced by preparing a polymerizable composition in the same manner as Example 12 except that the blending amount of HMDI was modified to 36.3 parts by mass, the blending amount of the polythiol (B-1-1) was modified to 38.1 parts by mass, 19.4 parts by mass of TMDI was used instead of HDI, and 6.1 parts by mass of TMTP was used instead of TMTG.

Example 16

The plastic lens of Example 16 was produced by preparing a polymerizable composition in the same manner as Example 12 except that the blending amount of HMDI was modified to 42.2 parts by mass, the blending amount of the polythiol (B-1-1) was modified to 37.9 parts by mass, 14.5 parts by mass of TMDI was used instead of HDI, and 5.5 parts by mass of BDTG was used instead of TMTG.

Example 17

The plastic lens of Example 17 was produced by preparing a polymerizable composition in the same manner as Example 1 except that 42.9 parts by mass of bis(isocyanatemethyl)cyclohexane (hereinbelow, described as "HXDI") was used instead of IPDI, the blending amount of the polythiol (B-1-1) was modified to 27.0 parts by mass, the blending amount of HDI was modified to 4.1 parts by mass, and 26.1 parts by mass of TMTP was used instead of TMTG.

Example 18

The plastic lens of Example 18 was produced by preparing a polymerizable composition in the same manner as Example 17 except that the blending amount of HXDI was modified to 42.9 parts by mass, the blending amount of the polythiol (B-1-1) was modified to 38.1 parts by mass, the blending amount of HDI was modified to 6.6 parts by mass, and 12.4 parts by mass of BDTG was used instead of TMTP.

Example 19

The plastic lens of Example 19 was produced by preparing a polymerizable composition in the same manner as Example 17 except that the blending amount of HXDI was modified to 29.1 parts by mass, the blending amount of the polythiol (B-1-1) was modified to 32.1 parts by mass, 21.0 parts by mass of TMDI was used instead of HDI, and 17.8 parts by mass of TMTG was used instead of TMTP.

Example 20

The plastic lens of Example 20 was produced by preparing a polymerizable composition in the same manner as Example 17 except that the blending amount of HXDI was modified to 34.8 parts by mass, the blending amount of the polythiol (B-1-1) was modified to 39.9 parts by mass, 16.1 parts by mass of TMDI was used instead of HDI, and 9.2 parts by mass of BDTG was used instead of TMTP.

Example 21

The plastic lens of Example 21 was produced by preparing a polymerizable composition in the same manner as Example 1 except that 52.0 parts by mass of bis(isocyanatemethyl)bicyclo[2.2.1]heptane (hereinbelow, described as "NBDI") was used instead of IPDI, the blending amount of the polythiol (B-1-1) was modified to 28.5 parts by mass, the blending amount of HDI was modified to 3.7 parts by mass, and the blending amount of TMTG was modified to 15.8 parts by mass.

Example 22

The plastic lens of Example 22 was produced by preparing a polymerizable composition in the same manner as Example 21 except that the blending amount of NBDI was modified to 52.3 parts by mass, the blending amount of the polythiol (B-1-1) was modified to 30.7 parts by mass, the blending amount of HDI was modified to 3.8 parts by mass, and 13.3 parts by mass of BDTG was used instead of TMTG.

Example 23

The plastic lens of Example 23 was produced by preparing a polymerizable composition in the same manner as Example 21 except that the blending amount of NBDI was modified to 34.8 parts by mass, the blending amount of the polythiol (B-1-1) was modified to 28.6 parts by mass, 18.8 parts by mass of TMDI was used instead of HDI, and 17.8 parts by mass of TMTP was used instead of TMTG.

Example 24

The plastic lens of Example 24 was produced by preparing a polymerizable composition in the same manner as Example 21 except that the blending amount of NBDI was modified to 35.8 parts by mass, the blending amount of the polythiol (B-1-1) was modified to 35.7 parts by mass, 19.3 parts by mass of TMDI was used instead of HDI, and 9.2 parts by mass of BDTP was used instead of TMTG.

Comparative Example 1

The plastic lens of Comparative Example 1 was produced by preparing a polymerizable composition in the same manner as Example 12 except that the blending amount of HMDI was modified to 58.9 parts by mass, the blending amount of the polythiol (B-1-1) was modified to 41.1 parts by mass, and HDI and TMTG were not used.

Comparative Example 2

The plastic lens of Comparative Example 2 was produced by preparing a polymerizable composition in the same manner as Example 12 except that the blending amount of HMDI was modified to 46.6 parts by mass, the blending amount of the polythiol (B-1-1) was modified to 43.4 parts by mass, and the blending amount of HDI was modified to 10.0 parts by mass, and TMTG was not used.

Comparative Example 3

The plastic lens of Comparative Example 3 was produced by preparing a polymerizable composition in the same manner as Example 12 except that the blending amount of HMDI was modified to 58.1 parts by mass, the blending amount of the polythiol (B-1-1) was modified to 36.9 parts by mass, 4.9 parts by mass of pentaerythritol tetrakis(mercaptopropionate) (hereinbelow, described as "PTMP") was used instead of TMTG, and HDI was not used.

Comparative Example 4

The plastic lens of Comparative Example 4 was produced by preparing a polymerizable composition in the same manner as Example 17 except that the blending amount of HXDI was modified to 51.4 parts by mass, the blending amount of the polythiol (B-1-1) was modified to 48.6 parts by mass, and HDI and TMTG were not used.

Comparative Example 5

The plastic lens of Comparative Example 5 was produced by preparing a polymerizable composition in the same manner as Example 17 except that the blending amount of HXDI was modified to 36.8 parts by mass, the blending amount of the polythiol (B-1-1) was modified to 49.6 parts by mass, the blending amount of HDI was modified to 13.6 parts by mass, and TMTP was not used.

Comparative Example 6

The plastic lens of Comparative Example 6 was produced by preparing a polymerizable composition in the same manner as Example 21 except that the blending amount of NBDI was modified to 58.7 parts by mass, the blending amount of the polythiol (B-1-1) was modified to 41.3 parts by mass, and HDI and TMTG were not used.

Comparative Example 7

The plastic lens of Comparative Example 7 was produced by preparing a polymerizable composition in the same manner as Example 21 except that the blending amount of NBDI was modified to 36.9 parts by mass, the blending amount of the polythiol (B-1-1) was modified to 43.3 parts by mass, 19.9 parts by mass of TMDI was used instead of HDI, and TMTG was not used.

Comparative Example 8

The plastic lens of Comparative Example 8 was produced by preparing a polymerizable composition in the same manner as Example 1 except that 50.7 parts by mass of xylylene diisocyanate (hereinbelow, described as "XDI") was used instead of IPDI, the blending amount of the polythiol (B-1-1) was modified to 49.3 parts by mass, and HDI and TMTG were not used.

Comparative Example 9

The plastic lens of Comparative Example 9 was produced by preparing a polymerizable composition in the same manner as Comparative Example 8 except that the blending amount of XDI was modified to 52.7 parts by mass, the blending amount of the polythiol (B-1-1) was modified to 44.3 parts by mass, and 2.6 parts by mass of thioglycerin (hereinbelow, described as "TG") was used.

Comparative Example 10

The plastic lens of Comparative Example 10 was produced by preparing a polymerizable composition in the same manner as Comparative Example 8 except that the blending amount of XDI was modified to 49.9 parts by mass, the blending amount of the polythiol (B-1-1) was modified to 38.9 parts by mass, and 11.3 parts by mass of dimercaptomethyldithiane (hereinbelow, described as "DMMD") was used.

Reference Example 1

The plastic lens of Reference Example 1 was produced by preparing a polymerizable composition in the same manner as Example 1 except that the blending amount of IPDI was modified to 54.8 parts by mass, the blending amount of the polythiol (B-1-1) was modified to 45.2 parts by mass, and HDI and TMTG were not used.

Reference Example 2

The plastic lens of Reference Example 2 was produced by preparing a polymerizable composition in the same manner as Example 1 except that the blending amount of IPDI was modified to 29.4 parts by mass, the blending amount of the polythiol (B-1-1) was modified to 48.4 parts by mass, the blending amount of HDI was modified to 22.2 parts by mass, and TMTG was not used.

Reference Example 3

The plastic lens of Reference Example 3 was produced by preparing a polymerizable composition in the same manner as Example 1 except that the blending amount of IPDI was modified to 33.3 parts by mass, the blending amount of the polythiol (B-1-1) was modified to 45.7 parts by mass, 21.0 parts by mass of TMDI was used instead of HDI, and TMTG was not used.

Reference Example 4

The plastic lens of Reference Example 4 was produced by preparing a polymerizable composition in the same manner as Example 1 except that the blending amount of IPDI was modified to 54.1 parts by mass, the blending amount of the polythiol (B-1-1) was modified to 40.1 parts by mass, the blending amount of TMTG was modified to 5.8 parts by mass, and HDI was not used.

Reference Example 5

The plastic lens of Reference Example 5 was produced by preparing a polymerizable composition in the same manner as Example 1 except that the blending amount of IPDI was modified to 53.7 parts by mass, the blending amount of the polythiol (B-1-1) was modified to 39.9 parts by mass, 6.4 parts by mass of TMTP was used instead of TMTG, and HDI was not used.

Reference Example 6

The plastic lens of Reference Example 6 was produced by preparing a polymerizable composition in the same manner as Example 1 except that the blending amount of IPDI was modified to 54.1 parts by mass, the blending amount of the polythiol (B-1-1) was modified to 40.1 parts by mass, 5.8 parts by mass of BDTG was used instead of TMTG, and HDI was not used.

Reference Example 7

The plastic lens of Reference Example 7 was produced by preparing a polymerizable composition in the same manner as Example 1 except that the blending amount of IPDI was modified to 53.7 parts by mass, the blending amount of the polythiol (B-1-1) was modified to 39.9 parts by mass, 6.4 parts by mass of BDTP was used instead of TMTG, and HDI was not used.

Reference Example 8

The plastic lens of Reference Example 8 was produced by preparing a polymerizable composition in the same manner as Example 12 except that the blending amount of HMDI was modified to 53.1 parts by mass, the blending amount of the polythiol (B-1-1) was modified to 41.3 parts by mass, 5.6 parts by mass of hexylisocyanate (hereinbelow, described as "HI") was used instead of HDI, and TMTG was not used.

Compounds and blending amounts of the alicyclic polyisocyanate (A-1), the non-cyclic aliphatic polyisocyanate (A-2), the polyisocyanate (A-3) other than the alicyclic polyisocyanate (A-1) and the non-cyclic aliphatic polyisocyanate (A-2), the polythiol (B-1), the polythiol (B-2), and the polythiol (B-3) other than the polythiol (B-1) and the polythiol (B-2), which are present in the polymerizable composition used for producing the plastic lenses of Examples, Comparative Examples, and Reference Examples, are shown in the following Table 1 and Table 2.

TABLE 1

Polyisocyanate and polythiol of Examples

| | Polyisocyanate | | | Polythiol | | |
|---|---|---|---|---|---|---|
| | A-1 | A-2 | A-3 | B-1 | B-2 | B-3 |
| Example 1 | IPDI 33.6 parts by mass | HDI 16.9 parts by mass | — | Polythiol (B-1-1) 35.1 parts by mass | TMTG 14.4 parts by mass | — |
| Example 2 | IPDI 43.6 parts by mass | HDI 8.2 parts by mass | — | Polythiol (B-1-1) 34.2 parts by mass | TMTG 14.0 parts by mass | — |
| Example 3 | IPDI 34.2 parts by mass | HDI 17.3 parts by mass | — | Polythiol (B-1-1) 42.4 parts by mass | TMTG 6.1 parts by mass | — |
| Example 4 | IPDI 42.7 parts by mass | HDI 8.1 parts by mass | — | Polythiol (B-1-1) 26.4 parts by mass | TMTG 22.8 parts by mass | — |
| Example 5 | IPDI 35.8 parts by mass | HDI 14.6 parts by mass | — | Polythiol (B-1-1) 36.4 parts by mass | TMTP 13.2 parts by mass | — |
| Example 6 | IPDI 40.5 parts by mass | HDI 11.3 parts by mass | — | Polythiol (B-1-1) 37.5 parts by mass | BDTG 10.7 parts by mass | — |
| Example 7 | IPDI 33.3 parts by mass | HDI 16.8 parts by mass | — | Polythiol (B-1-1) 36.6 parts by mass | BDTP 13.3 parts by mass | — |
| Example 8 | IPDI 38.2 parts by mass | TMDI 15.5 parts by mass | — | Polythiol (B-1-1) 40.5 parts by mass | TMTG 5.8 parts by mass | — |
| Example 9 | IPDI 32.6 parts by mass | TMDI 20.6 parts by mass | — | Polythiol (B-1-1) 40.3 parts by mass | TMTP 6.5 parts by mass | — |
| Example 10 | IPDI 37.7 parts by mass | TMDI 15.3 parts by mass | — | Polythiol (B-1-1) 35.5 parts by mass | BDTG 11.5 parts by mass | — |
| Example 11 | IPDI 42.4 parts by mass | TMDI 10.0 parts by mass | — | Polythiol (B-1-1) 34.9 parts by mass | BDTP 12.7 parts by mass | — |
| Example 12 | HMDI 37.3 parts by mass | HDI 16.0 parts by mass | — | Polythiol (B-1-1) 32.6 parts by mass | TMTG 14.1 parts by mass | — |
| Example 13 | HMDI 47.8 parts by mass | HDI 7.7 parts by mass | — | Polythiol (B-1-1) 35.5 parts by mass | TMTP 9.1 parts by mass | — |
| Example 14 | HMDI 37.8 parts by mass | HDI 16.2 parts by mass | — | Polythiol (B-1-1) 39.6 parts by mass | BDTP 6.4 parts by mass | — |
| Example 15 | HMDI 36.3 parts by mass | TMDI 19.4 parts by mass | — | Polythiol (B-1-1) 38.1 parts by mass | TMTP 6.1 parts by mass | — |

TABLE 1-continued

Polyisocyanate and polythiol of Examples

| | Polyisocyanate | | | Polythiol | | |
|---|---|---|---|---|---|---|
| | A-1 | A-2 | A-3 | B-1 | B-2 | B-3 |
| Example 16 | HMDI 42.2 parts by mass | TMDI 14.5 parts by mass | — | Polythiol (B-1-1) 37.9 parts by mass | BDTG 5.5 parts by mass | — |
| Example 17 | HXDI 42.9 parts by mass | HDI 4.1 parts by mass | — | Polythiol (B-1-1) 27.0 parts by mass | TMTP 26.1 parts by mass | — |
| Example 18 | HXDI 42.9 parts by mass | HDI 6.6 parts by mass | — | Polythiol (B-1-1) 38.1 parts by mass | BDTG 12.4 parts by mass | — |
| Example 19 | HXDI 29.1 parts by mass | TMDI 21.0 parts by mass | — | Polythiol (B-1-1) 32.1 parts by mass | TMTG 17.8 parts by mass | — |
| Example 20 | HXDI 34.8 parts by mass | TMDI 16.1 parts by mass | — | Polythiol (B-1-1) 39.9 parts by mass | BDTG 9.2 parts by mass | — |
| Example 21 | NBDI 52.0 parts by mass | HDI 3.7 parts by mass | — | Polythiol (B-1-1) 28.5 parts by mass | TMTG 15.8 parts by mass | — |
| Example 22 | NBDI 52.3 parts by mass | HDI 3.8 parts by mass | — | Polythiol (B-1-1) 30.7 parts by mass | BDTG 13.3 parts by mass | — |
| Example 23 | NBDI 34.8 parts by mass | TMDI 18.8 parts by mass | — | Polythiol (B-1-1) 28.6 parts by mass | TMTP 17.8 parts by mass | — |
| Example 24 | NBDI 35.8 parts by mass | TMDI 19.3 parts by mass | — | Polythiol (B-1-1) 35.7 parts by mass | BDTP 9.2 parts by mass | — |

TABLE 2

Polyisocyanate and polythiol of Comparative Examples and Reference Examples

| | Polyisocyanate | | | Polythiol | | |
|---|---|---|---|---|---|---|
| | A-1 | A-2 | A-3 | B-1 | B-2 | B-3 |
| Comparative Example 1 | HMDI 58.9 parts by mass | — | — | Polythiol (B-1-1) 41.1 parts by mass | — | — |
| Comparative Example 2 | HMDI 46.6 parts by mass | HDI 10.0 parts by mass | — | Polythiol (B-1-1) 43.4 parts by mass | — | — |
| Comparative Example 3 | HMDI 58.1 parts by mass | — | — | Polythiol (B-1-1) 36.9 parts by mass | — | PTMP 4.9 parts by mass |
| Comparative Example 4 | HXDI 51.4 parts by mass | — | — | Polythiol (B-1-1) 48.6 parts by mass | — | — |
| Comparative Example 5 | HXDI 36.8 parts by mass | HDI 13.6 parts by mass | — | Polythiol (B-1-1) 49.6 parts by mass | — | — |
| Comparative Example 6 | NBDI 58.7 parts by mass | — | — | Polythiol (B-1-1) 41.3 parts by mass | — | — |
| Comparative Example 7 | NBDI 36.9 parts by mass | TMDI 19.9 parts by mass | — | Polythiol (B-1-1) 43.3 parts by mass | — | — |
| Comparative Example 8 | — | — | XDI 50.7 parts by mass | Polythiol (B-1-1) 49.3 parts by mass | — | — |
| Comparative Example 9 | — | — | XDI 52.7 parts by mass | Polythiol (B-1-1) 44.3 parts by mass | — | TG 2.6 parts by mass |
| Comparative Example 10 | — | — | XDI 49.9 parts by mass | Polythiol (B-1-1) 38.9 parts by mass | — | DMMD 11.3 parts by mass |
| Reference Example 1 | IPDI 54.8 parts by mass | — | — | Polythiol (B-1-1) 45.2 parts by mass | — | — |

TABLE 2-continued

| | Polyisocyanate and polythiol of Comparative Examples and Reference Examples | | | | | |
|---|---|---|---|---|---|---|
| | Polyisocyanate | | | Polythiol | | |
| | A-1 | A-2 | A-3 | B-1 | B-2 | B-3 |
| Reference Example 2 | IPDI 29.4 parts by mass | HDI 22.2 parts by mass | — | Polythiol (B-1-1) 48.4 parts by mass | | |
| Reference Example 3 | IPDI 33.3 parts by mass | TMDI 21.0 parts by mass | — | Polythiol (B-1-1) 45.7 parts by mass | — | — |
| Reference Example 4 | IPDI 54.1 parts by mass | — | — | Polythiol (B-1-1) 40.1 parts by mass | TMTG 5.8 parts by mass | — |
| Reference Example 5 | IPDI 53.7 parts by mass | — | — | Polythiol (B-1-1) 39.9 parts by mass | TMTP 6.4 parts by mass | — |
| Reference Example 6 | IPDI 54.1 parts by mass | — | — | Polythiol (B-1-1) 40.1 parts by mass | BDTG 5.8 parts by mass | — |
| Reference Example 7 | IPDI 53.7 parts by mass | — | — | Polythiol (B-1-1) 39.9 parts by mass | BDTP 6.4 parts by mass | — |
| Reference Example 8 | HMDI 53.1 parts by mass | — | HI 5.6 parts by mass | Polythiol (B-1-1) 41.3 parts by mass | — | — |

(Results)

The results of evaluating the plastic lenses of Examples, Comparative Examples, and Reference Examples in terms of Abbe number, heat resistance, striae, transparency, optical distortion, and tensile strength are shown in the following Table 3 and Table 4.

TABLE 3

| | Evaluation results of plastic lenses of Examples | | | | | | |
|---|---|---|---|---|---|---|---|
| | Refractive index $n_e$ | Abbe number $\nu_e$ | Heat resistance ° C. | Striae | Transparency | Optical distortion | Tensile strength kgf |
| Example 1 | 1.60 | 40 | 116 | VG | VG | VG | 62 |
| Example 2 | 1.59 | 40 | 122 | VG | VG | VG | 54 |
| Example 3 | 1.60 | 39 | 114 | VG | VG | VG | 52 |
| Example 4 | 1.58 | 41 | 114 | VG | VG | VG | 60 |
| Example 5 | 1.59 | 40 | 112 | VG | VG | VG | 59 |
| Example 6 | 1.60 | 39 | 118 | VG | VG | VG | 63 |
| Example 7 | 1.60 | 40 | 99 | VG | VG | VG | 63 |
| Example 8 | 1.60 | 40 | 120 | VG | VG | VG | 61 |
| Example 9 | 1.60 | 40 | 112 | VG | VG | VG | 50 |
| Example 10 | 1.59 | 40 | 105 | VG | VG | VG | 49 |
| Example 11 | 1.59 | 40 | 110 | G | VG | VG | 49 |
| Example 12 | 1.60 | 40 | 87 | G | VG | VG | 64 |
| Example 13 | 1.60 | 41 | 121 | VG | VG | VG | 59 |
| Example 14 | 1.60 | 40 | 104 | VG | VG | VG | 63 |
| Example 15 | 1.60 | 40 | 113 | VG | VG | VG | 62 |
| Example 16 | 1.60 | 40 | 104 | VG | VG | VG | 61 |
| Example 17 | 1.59 | 41 | 99 | VG | VG | VG | 63 |
| Example 18 | 1.61 | 39 | 97 | VG | VG | VG | 60 |
| Example 19 | 1.59 | 40 | 92 | G | VG | VG | 49 |
| Example 20 | 1.61 | 39 | 92 | VG | VG | VG | 53 |
| Example 21 | 1.60 | 41 | 98 | VG | VG | VG | 61 |
| Example 22 | 1.60 | 40 | 82 | VG | VG | VG | 63 |

TABLE 3-continued

Evaluation results of plastic lenses of Examples

| | Refractive index $n_e$ | Abbe number $v_e$ | Heat resistance ° C. | Striae | Transparency | Optical distortion | Tensile strength kgf |
|---|---|---|---|---|---|---|---|
| Example 23 | 1.59 | 41 | 88 | G | VG | VG | 46 |
| Example 24 | 1.59 | 41 | 105 | VG | VG | VG | 45 |

TABLE 4

Evaluation results of plastic lenses of Comparative Examples and Reference Examples

| | Refractive index $n_e$ | Abbe number $v_e$ | Heat resistance ° C. | Striae | Transparency | Optical distortion | Tensile strength kgf |
|---|---|---|---|---|---|---|---|
| Comparative Example 1 | 1.60 | 41 | 136 | B | VG | G | 50 |
| Comparative Example 2 | 1.61 | 40 | 120 | B | VG | G | 54 |
| Comparative Example 3 | 1.60 | 41 | 128 | B | VG | B | 63 |
| Comparative Example 4 | 1.62 | 38 | 120 | B | VG | VG | 66 |
| Comparative Example 5 | 1.62 | 37 | 108 | B | VG | G | 32 |
| Comparative Example 6 | 1.62 | 40 | 104 | B | G | B | 66 |
| Comparative Example 7 | 1.61 | 39 | 102 | B | VG | B | 46 |
| Comparative Example 8 | 1.67 | 32 | 109 | B | VG | G | 65 |
| Comparative Example 9 | 1.66 | 32 | 110 | B | VG | G | 76 |
| Comparative Example 10 | 1.67 | 32 | 107 | B | VG | B | 73 |
| Reference Example 1 | 1.60 | 39 | 152 | G | VG | VG | 13 |
| Reference Example 2 | 1.61 | 38 | 111 | G | VG | G | 20 |
| Reference Example 3 | 1.60 | 39 | 119 | G | VG | G | 15 |
| Reference Example 4 | 1.59 | 40 | 137 | G | VG | G | 20 |
| Reference Example 5 | 1.60 | 40 | 139 | G | VG | G | 21 |
| Reference Example 6 | 1.60 | 40 | 132 | G | VG | G | 19 |
| Reference Example 7 | 1.59 | 40 | 131 | G | VG | G | 15 |
| Reference Example 8 | 1.60 | 41 | 105 | G | VG | G | 19 |

The plastic lenses of Examples 1 to 24 were satisfactory in terms of the item for evaluating the striae. They are also satisfactory in terms of the item for evaluating the refractive index, Abbe number, transparency, and optical distortion. On the other hand, the plastic lenses of Comparative Examples 1 to 10 were not satisfactory in terms of the item for evaluating the striae. Based on this, it was possible to confirm that, by using a polymerizable composition containing an isocyanate component which contains the alicyclic polyisocyanate (A-1) and the non-cyclic aliphatic polyisocyanate (A-2) and a polythiol component which contains the polythiol (B-1) and the polythiol (B-2), a plastic lens with reduced striae can be obtained.

The plastic lenses of Reference Examples 1 to 7 were satisfactory in terms of the item for evaluating the striae. However, the evaluation item relating to tensile strength was significantly poorer compared to the plastic lenses of Examples 1 to 24. Based on this, it was possible to confirm that, when the alicyclic polyisocyanate (A-1) and the polythiol (B-1) are used and also any one of the non-cyclic aliphatic polyisocyanate (A-2) and the polythiol (B-2) is used, a plastic lens with reduced striae can be produced but the tensile strength of the lens becomes very low.

The plastic lens of Reference Example 8 was satisfactory in terms of the item for evaluating the striae. However, the evaluation item relating to tensile strength was significantly poorer compared to the plastic lenses of Examples 1 to 24. Based on this, it was possible to confirm that, when a polymerizable composition containing the alicyclic polyisocyanate (A-1), the polythiol (B-1), and hexyl isocyanate (HI) is used, a plastic lens with reduced striae can be produced but the tensile strength of the lens becomes very low.

Finally, the embodiments of the present disclosure are summarized.

One embodiment of the present disclosure is a polymerizable composition containing an isocyanate component which contains the alicyclicpolyisocyanate (A-1) having two or more isocyanate groups and the non-cyclic aliphatic polyisocyanate (A-2) having two or more isocyanate groups, and a polythiol component which contains the polythiol (B-1) having four or more mercapto groups and two or more sulfide bonds and the polythiol (B-2) having two or three mercapto groups and two or three ester bonds.

According to the present disclosure, a polymerizable composition allowing obtainment of an optical component with reduced striae, an optical component obtained from the polymerizable composition, a plastic lens containing the optical component, and a spectacle lens including a lens substrate including the optical component can be provided.

It should be understood that the embodiments disclosed herein are illustrative and non-restrictive in every respect. The scope of the present disclosure is defined by the scope of the claims, rather than the description above, and is intended to include any modifications within the scope and meaning equivalent to the scope of the claims.

The invention claimed is:

1. A polymerizable composition comprising;
   an isocyanate component which comprises alicyclic polyisocyanate (A-1) having two or more isocyanate groups and non-cyclic aliphatic polyisocyanate (A-2) having two or more isocyanate groups; and
   a polythiol component which comprises polythiol (B-1) having four or more mercapto groups and two or more sulfide bonds and polythiol (B-2) having two or three mercapto groups and two or three ester bonds.

2. The polymerizable composition according to claim 1, wherein the polythiol (B-1) comprises at least one selected from a group consisting of 4,8-bis(mercaptomethyl)-3,6,9-trithiaundecane-1,11-dithiol, 4,7-bis(mercaptomethyl)-3,6,9-trithiaundecane-1,11-dithiol, and 5,7-bis(mercaptomethyl)-3,6,9-trithiaundecane-1,11-dithiol.

3. The polymerizable composition according to claim 1, wherein the alicyclic polyisocyanate (A-1) comprises at least one selected from a group consisting of isophorone diisocyanate, methylene biscyclohexyl diisocyanate, bis(isocyanatemethyl)cyclohexane, and bis(isocyanatemethyl)bicyclo[2.2.1]heptane.

4. The polymerizable composition according to claim 1, wherein the non-cyclic aliphatic polyisocyanate (A-2) comprises at least one selected from a group consisting of hexamethylene diisocyanate and trimethylhexamethylene diisocyanate.

5. The polymerizable composition according to claim 1, wherein the polythiol (B-2) comprises at least one selected from a group consisting of trimethylol propane tris(thioglycolate), trimethylol propane tris(3-mercaptopropionate), 1,4-butanediol bis(thioglycolate), and 1,4-butanediol bis(3-mercaptopropionate).

6. The polymerizable composition according to claim 1, wherein
   the alicyclic polyisocyanate (A-1) comprises at least one selected from a group consisting of isophorone diisocyanate, methylene biscyclohexyl diisocyanate, bis(isocyanatemethyl)cyclohexane, and bis(isocyanatemethyl)bicyclo[2.2.1]heptane,
   the non-cyclic aliphatic polyisocyanate (A-2) is at least one selected from a group consisting of hexamethylene diisocyanate and trimethylhexamethylene diisocyanate,
   the polythiol (B-1) comprises at least one selected from a group consisting of 4,8-bis(mercaptomethyl)-3,6,9-trithiaundecane-1,11-dithiol, 4,7-bis(mercaptomethyl)-3,6,9-trithiaundecane-1,11-dithiol, and 5,7-bis(mercaptomethyl)-3,6,9-trithiaundecane-1,11-dithiol, and,
   the polythiol (B-2) comprises at least one selected from a group consisting of trimethylol propane tris(thioglycolate), trimethylol propane tris(3-mercaptopropionate), 1,4-butanediol bis(thioglycolate), and 1,4-butanediol bis(3-mercaptopropionate).

7. The polymerizable composition according to claim 1, wherein the polythiol (B-2) has three mercapto groups.

8. The polymerizable composition according to claim 1, wherein the ratio of the total of the alicyclic polyisocyanate (A-1) and the non-cyclic aliphatic polyisocyanate (A-2) is 80% by mass or more relative to the total mass of the isocyanate component.

9. The polymerizable composition according to claim 1, wherein the molar ratio [(A-1)/(A-2)] between the alicyclic polyisocyanate (A-1) and the non-cyclic aliphatic polyisocyanate (A-2) is 95/5 to 50/50.

10. The polymerizable composition according to claim 1, wherein the ratio of the total of the polythiol (B-1) and the polythiol (B-2) is 70% by mass or more relative to the total mass of the polythiol component.

11. The polymerizable composition according to claim 1, wherein the molar ratio [(B-1)/(B-2)] between the polythiol (B-1) and the polythiol (B-2) is 90/10 to 50/50.

12. An optical component obtained by polymerizing the polymerizable composition according to claim 1.

13. A plastic lens comprising the optical component according to claim 12.

14. A spectacle lens comprising a lens substrate which comprises the optical component according to claim 12.

* * * * *